(12) United States Patent
Katou et al.

(10) Patent No.: US 8,893,481 B2
(45) Date of Patent: Nov. 25, 2014

(54) REDUCTANT AQUEOUS SOLUTION MIXING DEVICE AND EXHAUST AFTERTREATMENT DEVICE PROVIDED WITH THE SAME

(71) Applicants: Takashi Katou, Oyama (JP); Hiroyuki Tomioka, Oyama (JP); Boku Itou, Oyama (JP)

(72) Inventors: Takashi Katou, Oyama (JP); Hiroyuki Tomioka, Oyama (JP); Boku Itou, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/000,580

(22) PCT Filed: Jan. 17, 2013

(86) PCT No.: PCT/JP2013/050793
§ 371 (c)(1),
(2), (4) Date: Aug. 20, 2013

(87) PCT Pub. No.: WO2014/112067
PCT Pub. Date: Jul. 24, 2014

(65) Prior Publication Data
US 2014/0196442 A1 Jul. 17, 2014

(51) Int. Cl.
*F01N 3/00* (2006.01)
*F01N 3/10* (2006.01)

(52) U.S. Cl.
CPC ........................................ *F01N 3/10* (2013.01)
USPC .................................. 60/295; 60/301; 60/311

(58) Field of Classification Search
CPC .............. F01N 3/2066; F01N 2610/02; F01N 2610/1453; F01N 2240/20
USPC .................................... 60/295, 297, 301, 311
See application file for complete search history.

(56) References Cited

U.S. PATENT DOCUMENTS

| 5,284,016 A | 2/1994 | Stark et al. |
| D702,736 S * | 4/2014 | Tomioka et al. .................. D15/5 |

(Continued)

FOREIGN PATENT DOCUMENTS

| CN | 101815851 A | 8/2010 |
| DE | 102007055874 A1 | 6/2008 |

(Continued)

OTHER PUBLICATIONS

International Search Report (ISR) dated Apr. 23, 2013 issued in International Application No. PCT/JP2013/050793.

(Continued)

*Primary Examiner* — Jesse Bogue
*Assistant Examiner* — Patrick Maines
(74) *Attorney, Agent, or Firm* — Holtz, Holtz, Goodman & Chick PC

(57) ABSTRACT

A mixing device includes: an elbow pipe attached to an outlet pipe of a filter device; a straight pipe connected to a downstream side of the elbow pipe; and an injector attached to the elbow pipe and injecting a reductant aqueous solution into an inside of the elbow pipe toward the straight pipe. The elbow pipe is provided with an injector attachment to which the injector is attached with a bolt. An attachment face of the injector attachment is substantially flush with an end of an injection nozzle of the injector. The injector attachment is provided with a recess at which an end of the injection nozzle is exposed, the recess being enlarged toward the straight pipe. A heat-insulation layer located near an outer periphery of the recess is provided inside the injector attachment. An end of the bolt penetrates the injector from an outside to reach the heat-insulation layer.

4 Claims, 4 Drawing Sheets

(56) References Cited

U.S. PATENT DOCUMENTS

| | | |
|---|---|---|
| 8,696,777 B1 * | 4/2014 | Patil et al. .................... 55/385.3 |
| 2003/0079467 A1 | 5/2003 | Liu et al. |
| 2003/0110763 A1 * | 6/2003 | Pawson et al. ................. 60/286 |
| 2006/0191254 A1 | 8/2006 | Bui et al. |
| 2007/0001405 A1 | 1/2007 | Watanabe et al. |
| 2007/0110642 A1 | 5/2007 | Hirata |
| 2007/0193252 A1 | 8/2007 | McKinley et al. |
| 2008/0092526 A1 | 4/2008 | Kunkel et al. |
| 2008/0155973 A1 | 7/2008 | Maruyama et al. |
| 2008/0216470 A1 | 9/2008 | Sedlacek et al. |
| 2009/0158722 A1 | 6/2009 | Kojima et al. |
| 2009/0313979 A1 * | 12/2009 | Kowada ........................ 60/297 |
| 2010/0107612 A1 * | 5/2010 | Yamazaki et al. ............. 60/295 |
| 2010/0146950 A1 * | 6/2010 | Hayashi et al. ................ 60/301 |
| 2010/0178216 A1 * | 7/2010 | Honda et al. .................. 422/171 |
| 2010/0186393 A1 * | 7/2010 | Kowada ........................ 60/295 |
| 2010/0212292 A1 | 8/2010 | Rusch et al. |
| 2010/0212301 A1 | 8/2010 | De Rudder et al. |
| 2010/0263354 A1 | 10/2010 | Sedlacek et al. |
| 2010/0263359 A1 | 10/2010 | Haverkamp et al. |
| 2011/0011060 A1 | 1/2011 | McCarthy |
| 2011/0061374 A1 | 3/2011 | Noritake |
| 2011/0079003 A1 * | 4/2011 | Sun et al. ....................... 60/310 |
| 2011/0094206 A1 | 4/2011 | Liu et al. |
| 2011/0192140 A1 * | 8/2011 | Olivier et al. .................. 60/274 |
| 2011/0214416 A1 | 9/2011 | Kowada et al. |
| 2011/0308234 A1 | 12/2011 | De Rudder et al. |
| 2012/0124983 A1 * | 5/2012 | Hong ............................. 60/324 |
| 2012/0324872 A1 | 12/2012 | Jaruvatee et al. |
| 2013/0064725 A1 | 3/2013 | Kageyama et al. |
| 2013/0164181 A1 * | 6/2013 | Iijima et al. ................... 422/169 |
| 2013/0164182 A1 * | 6/2013 | Iijima et al. ................... 422/169 |
| 2013/0164183 A1 * | 6/2013 | Iijima et al. ................... 422/170 |
| 2013/0219871 A1 * | 8/2013 | Crandell et al. ................ 60/295 |

FOREIGN PATENT DOCUMENTS

| | | | |
|---|---|---|---|
| DE | 10 2007 034 316 A1 | | 1/2009 |
| DE | 102008055190 A1 | | 7/2009 |
| DE | 10 2008 043 408 A1 | | 5/2010 |
| DE | 10201201087 | * | 5/2010 |
| DE | 10 2012 010 878 A1 | | 12/2013 |
| EP | 2184455 A1 | | 5/2010 |
| EP | 2 314 837 A1 | | 4/2011 |
| EP | 2578828 A1 | | 4/2013 |
| FR | 2965011 A1 | | 3/2012 |
| JP | 57-11261 U | | 1/1982 |
| JP | 2004-270609 A | | 9/2004 |
| JP | 2007-10099 A | | 1/2007 |
| JP | 2008-014213 A | | 1/2008 |
| JP | 2008-509328 A | | 3/2008 |
| JP | 2008-151088 A | | 7/2008 |
| JP | 2008-531921 A | | 8/2008 |
| JP | 2008-208726 A | | 9/2008 |
| JP | 2008-215286 A | | 9/2008 |
| JP | 2008-274878 A | | 11/2008 |
| JP | 2009-019610 A | | 1/2009 |
| JP | 2009-030560 A | | 2/2009 |
| JP | 2009-62816 A | | 3/2009 |
| JP | 2009-68415 A | | 4/2009 |
| JP | 2009-138627 A | | 6/2009 |
| JP | 2009138627 A | * | 6/2009 |
| JP | 2009-156072 A | | 7/2009 |
| JP | 2009-156076 A | | 7/2009 |
| JP | 2009-156077 A | | 7/2009 |
| JP | 2009-156078 A | | 7/2009 |
| JP | 2009-167806 A | | 7/2009 |
| JP | 2009167806 A | * | 7/2009 |
| JP | 2009-174485 A | | 8/2009 |
| JP | 2009174485 A | * | 8/2009 |
| JP | 2010-101236 A | | 5/2010 |
| JP | 2010-180863 A | | 8/2010 |
| JP | 2011-032970 A | | 2/2011 |
| JP | 2011-64069 A | | 3/2011 |
| JP | 2011-099390 A | | 5/2011 |
| JP | 2011-099416 A | | 5/2011 |
| JP | 2011-202512 A | | 10/2011 |
| JP | 2011-247128 A | | 12/2011 |
| JP | 2012-026456 A | | 2/2012 |
| WO | WO 2006/025110 A1 | | 3/2006 |
| WO | WO 2006/093594 A1 | | 9/2006 |
| WO | 2009024815 A2 | | 2/2009 |
| WO | WO 2012/120000 A1 | | 9/2012 |
| WO | 2013/127955 A1 | | 9/2013 |

OTHER PUBLICATIONS

U.S. Appl. No. 14/000,481, Title: "Reductant Aqueous Solution Mixing Device and Exhaust Aftertreatment Device Provided With the Same", filed Aug. 20, 2013, First Named Inventor: Takashi Katou.

U.S. Appl. No. 14/000,521, Title: "Reductant Aqueous Solution Mixing Device and Exhaust Aftertreatment Device Provided With the Same", filed Aug. 20, 2013, First Named Inventor: Takashi Katou.

U.S. Appl. No. 14/000,567, Title: "Reductant Aqueous Solution Mixing Device and Exhaust Aftertreatment Device Provided With the Same", filed Aug. 20, 2013, First Named Inventor: Tatsuya Watahiki.

U.S. Appl. No. 13/696,282, filed Nov. 5, 2012, Title: "Reducing Agent Aqueous Solution Mixing Device and Exhaust Gas Post-Treatment Device", First Named Inventor: Tadashi Iijima.

U.S. Appl. No. 13/696,293, filed Nov. 5, 2012, Title: "Reducing Agent Aqueous Solution Mixing Device and Exhaust Gas Post-Treatment Device", First Named Inventor: Tadashi Iijima.

U.S. Appl. No. 13/695,597, filed Oct. 31, 2012, Title: "Reducing Agent Aqueous Solution Mixing Device and Exhaust Gas Post-Treatment Device", First Named Inventor: Tadashi Iijima.

German Office Action dated Jun. 23, 2014 issued in counterpart German Application No. 11 2013 000 011.3.

* cited by examiner

REDUCTANT AQUEOUS SOLUTION MIXING DEVICE AND EXHAUST AFTERTREATMENT DEVICE PROVIDED WITH THE SAME

TECHNICAL FIELD

The invention relates to a reductant aqueous solution mixing device and an exhaust aftertreatment device provided with the reductant aqueous solution mixing device. Specifically, the invention relates to a reductant aqueous solution mixing device used for supplying a reductant aqueous solution such as urea aqueous solution to a selective catalytic reduction to purify exhaust gas and an exhaust aftertreatment device provided with the reductant aqueous solution mixing device.

BACKGROUND ART

An exhaust aftertreatment device that purifies nitrogen oxides (NOx) contained in exhaust gas of an engine with a selective catalytic reduction (abbreviated as "SCR" hereinafter) has been known. Urea aqueous solution injected by an injector is supplied to the SCR. The injector is attached as a component of a mixing device provided upstream of the SCR (see, for instance, Patent Literature 1). The urea aqueous solution is injected from the injector to exhaust gas flowing through the mixing device to mix the urea aqueous solution with the exhaust gas within the mixing device. As a result, the urea aqueous solution is thermally decomposed by the heat of the exhaust gas to produce ammonia. The ammonia is used as a reductant in the SCR.

Some of the mixing devices are provided with a block tapered member between the injector and a pipe to which the injector is attached so as to keep the injector from being influenced by the heat of the exhaust gas. The tapered member has a recess defined by a tapered face and an injection nozzle of the injector is exposed at a depth side of the recess (see, for instance, Patent Literature 2). However, with the use of such a block member, though the thermal influence of the exhaust gas can be reduced, since the injection nozzle is located remote from an exhaust pipe and the depth of the recess is increased, the exhaust gas becomes less likely to flow around toward the injection nozzle, so that drops of the urea aqueous solution are likely to be resided in the recess. When the resided urea aqueous solution is crystallized to be deposited, the injection of the urea aqueous solution from the injection nozzle is disturbed.

Thus, it has been proposed to use a plate-shaped heat insulation material instead of the above thick block tapered member (see, for instance, Patent Literature 3). According to the disclosure of Patent Literature 3, since the injection nozzle of the injector can be provided substantially flush with an opening of an exhaust pipe, the urea aqueous solution resided around the injection nozzle can be thermally decomposed by the heat of the exhaust gas, thereby restraining the deposition of the urea aqueous solution. In addition, since the part around the injection nozzle is covered with the heat insulation material, the thermal influence of the exhaust gas to the injector can also be restrained.

CITATION LIST

Patent Literatures

Patent Literature 1 JP-A-2008-208726
Patent Literature 2 JP-A-2008-14213
Patent Literature 3 JP-A-2009-138627

SUMMARY OF THE INVENTION

Problems to be Solved by the Invention

However, according to the disclosure of Patent Literature 3, an end of a bolt for fixing the injector to the exhaust pipe may penetrate through the exhaust pipe to be exposed to an inside of the exhaust pipe, thereby being in direct contact with the exhaust gas. Thus, the countermeasures for heat may not be sufficient, where the heat of the exhaust gas is transmitted to the injector via the bolt and the urea aqueous solution inside the injector may be deteriorated, causing adverse effects.

It is possible to provide an additional heat insulation material covering the end of the bolt in order to overcome the above deficiencies. However, such an arrangement results in a level difference between the heat insulation material and the injection nozzle, so that the exhaust gas is unlikely to flow around toward the injection nozzle and the urea aqueous solution is unfavorably likely to reside therein. In addition, a structure for securely fixing the heat insulation material covering the end of the bolt becomes complicated and the assembly process efficiency may be deteriorated.

An object of the invention is to provide a reductant aqueous solution mixing device that is capable of restraining residence of urea aqueous solution in a region around an injection nozzle of an injector and reliably restraining a heat transmission to the injector with a simple structure, and an exhaust aftertreatment device provided with the reductant aqueous solution mixing device.

Means for Solving the Problem(s)

A reductant aqueous solution mixing device according to a first aspect of the invention is interposed between a filter device that captures particulate matters in an exhaust gas and a selective catalytic reduction device disposed downstream of the filter device, the reductant aqueous solution mixing device adding a reductant aqueous solution in the exhaust gas, the reductant aqueous solution mixing device including: an elbow pipe attached to an outlet pipe of the filter device, the elbow pipe changing a flow direction of the exhaust gas flowing from the filter device; a straight pipe connected to a downstream side of the elbow pipe, the straight pipe extending in a direction intersecting an axial line of the outlet pipe of the filter device; and an injector attached to the elbow pipe, the injector injecting the reductant aqueous solution into an inside of the elbow pipe toward the straight pipe, in which the elbow pipe is provided with an injector attachment on which the injector is attached by a bolt, the injector attachment has an attachment face for the injector to be attached thereon, the attachment face being substantially flush with an end of an injection nozzle of the injector, the injector attachment is provided with a recess at which the end of the injection nozzle is exposed, the recess enlarging toward the straight pipe, a heat-insulation layer located near an outer periphery of the recess is provided inside the injector attachment, and an end of the bolt penetrates the injector from an outside to reach the heat-insulation layer in the injector attachment.

In the reductant aqueous solution mixing device according to a second aspect of the invention, an opening degree of the recess is preferably in a range from 120 to 140 degrees.

In the reductant aqueous solution mixing device according to a third aspect of the invention, the injector attachment includes a base plate on which the attachment face is provided and a sub-plate bonded to the base plate on a side near an inside of the elbow pipe, and the heat-insulation layer is provided in a closed space defined by bonding the base plate and the sub-plate.

In the reductant aqueous solution mixing device according to a fourth aspect of the invention, an injection opening for exposing the end of the injection nozzle to the inside of the elbow pipe is provided to the injector attachment, a gasket is interposed between the injector attachment and the injector, the gasket includes: an inner plate that is in contact with the attachment face of the injector attachment and has an inner opening corresponding to the injection opening; an outer plate that is in contact with the injector and has an outer opening corresponding to the injection opening; an annular outer periphery support ring held between outer peripheries of the inner plate and the outer plate; and an annular inner periphery heat-insulation ring held by a periphery of the inner opening of the inner plate and a periphery of the outer opening of the outer plate, and a gasket-side heat-insulation space covered with the inner plate, the outer plate, the outer periphery support ring and the inner periphery heat-insulation ring is provided inside the gasket.

In the reductant aqueous solution mixing device according to a fifth aspect of the invention, an annular abutment portion to be in contact with the gasket is provided at a position of the injector close to an outer periphery of the injector and being spaced away from the end of the injection nozzle, an injection-nozzle-side heat-insulation space opened toward an inside of the straight pipe through the injection opening is defined between the end of the injection nozzle and the abutment portion, and the injection-nozzle-side heat-insulation space is covered with the gasket.

In the reductant aqueous solution mixing device according to a sixth aspect of the invention, the heat-insulation layer is an air layer.

An exhaust aftertreatment device according to a seventh aspect of the invention includes: a filter device that captures particulate matters in an exhaust gas; a reductant aqueous solution mixing device being disposed downstream of the filter device in parallel to the filter device; and a selective catalytic reduction device disposed downstream of the reductant aqueous solution mixing device, the selective catalytic reduction device reducing and purifying a nitrogen oxide in the exhaust gas, the reductant aqueous solution mixing device being any one of the above aspects of the invention.

According to the first and seventh aspects of the invention, since the heat-insulation layer is provided near the outer periphery of the recess surrounding the injection nozzle of the injector, even when the thickness of the injector attachment including the recess and, consequently, the depth of the recess are reduced, the heat of the exhaust gas is not easily transferred to the injector, thereby keeping heat insulation properties. Since the depth of the recess is reduced, the exhaust gas easily flows to an inside of the recess, so that the reductant aqueous solution is reliably kept from residing in the part around the injection nozzle. Further, since the end of the bolt for attaching the injector to the injector attachment reaches the heat-insulation layer, the heat of the exhaust gas is restrained from being transferred to the injector through the bolt while ensuring sufficient screwing amount of the bolt with a simple structure.

According to the second aspect of the invention, since the open degree of the recess is set at an optimum range, the depth of the recess can be sufficiently reduced for efficiently introducing the exhaust gas while ensuring satisfactory heat insulation properties. It should be noted that, when the open degree is less than 90 degrees, the recess may become too deep to sufficiently introduce the exhaust gas.

According to the third aspect of the invention, a closed space can be easily defined by mutually bonding the base plate and the sub-plate and the heat-insulation layer can be easily provided in the closed space.

According to the fourth aspect of the invention, the interposed gasket prevents the leakage of the exhaust gas. Further, the gasket-side heat-insulation space provided in the gasket applies excellent heat insulation properties to the gasket itself, so that the thermal influence on the injector can be further reduced.

According to the fifth aspect of the invention, since the injection-nozzle-side heat-insulation space is defined around the injection nozzle, the reductant aqueous solution in the injection nozzle is kept from being overheated, thereby restraining the deterioration of the reductant aqueous solution.

According to the sixth aspect of the invention, since the heat-insulation layer is provided by an air layer, high heat insulation properties can be exhibited and the depth of the recess can be securely reduced.

DESCRIPTION OF EMBODIMENT(S)

Exemplary embodiment(s) of the invention will be described below with reference to the attached drawings.

Figure 1:
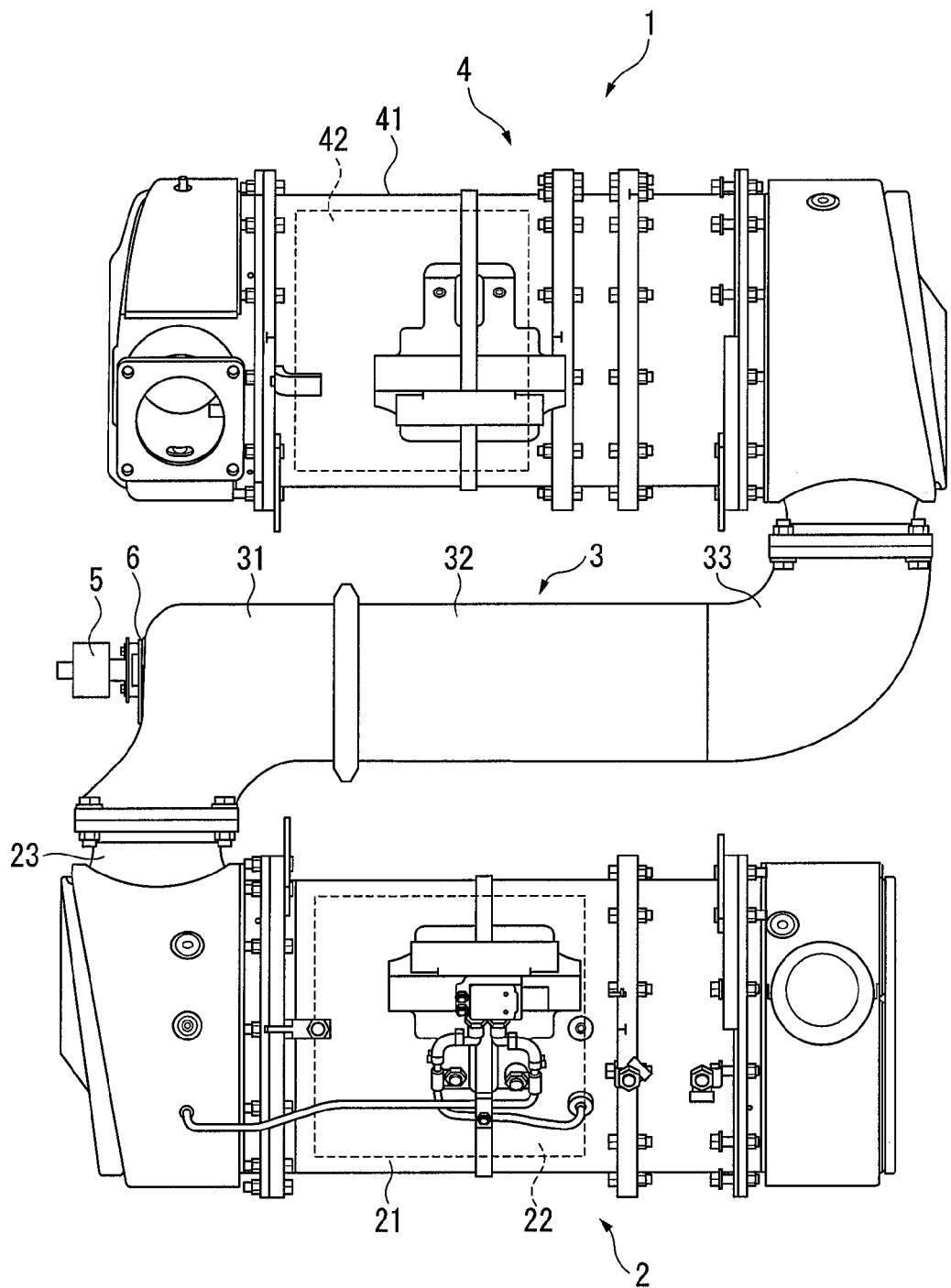
FIG. 1 is a plan view showing an exhaust aftertreatment device according to a first exemplary embodiment of the invention.

FIG. 1 is a plan view showing an exhaust aftertreatment device 1 according to the first exemplary embodiment. It should be noted that, in the following description, the term "upstream" refers to an upstream side in a flow direction of the exhaust gas and the term "downstream" refers to a downstream side in the flow direction of the exhaust gas.

As shown in FIG. 1, the exhaust aftertreatment device 1 includes a filter device in a form of a diesel particulate filter (abbreviated as "DPF" hereinafter) device 2, a reductant aqueous solution mixing device (referred to as a mixing device hereinafter) 3, and a selective catalytic reduction (abbreviated as "SCR" hereinafter) device 4. These devices 2 to 4 are provided in the exhaust pipe in which the exhaust gas from a diesel engine (not shown) flows. In a construction machine such as a hydraulic excavator, wheel loader and bulldozer, the exhaust aftertreatment device 1 is housed in an engine room together with the engine.

The DPF device 2 includes a cylindrical casing 21 and a cylindrical DPF 22 housed inside the casing 21. The DPF 22 captures the particulate matters in the exhaust gas passing through the DPF 22. An oxidation catalyst may be provided upstream of the DPF 22 in the casing 21. The oxidation catalyst oxidatively activates a post-injection fuel or a dosing fuel (both the same as diesel-engine fuel) supplied at an upstream side thereof to raise the temperature of the exhaust gas entering the DPF 22 to a temperature at which the DPF 22 is regenerable. The high-temperature exhaust gas causes a self-burning (burnout) of the particulate matters captured by the DPF 22 to regenerate the DPF 22.

The mixing device 3 adds a reductant aqueous solution in a form of urea aqueous solution in the exhaust gas. The mixing device 3 includes: an upstream elbow pipe 31 connected to an outlet pipe 23 of the DPF device 2 and serving as an elbow pipe for changing the flow direction of the exhaust gas flowing out of the DPF device 2 by approximately ninety degrees; a straight pipe 32 connected to a downstream end of the upstream elbow pipe 31 and extending in a direction intersecting an axial line CL2 (FIG. 2) of the outlet pipe 23 of the DPF device 2; a downstream elbow pipe 33 connected to a downstream end of the straight pipe 32 for further changing the flow direction of the exhaust gas from the straight pipe 32 by approximately ninety degrees; and an injector 5 attached to the upstream elbow pipe 31 and injecting the urea aqueous solution into an inside of the upstream elbow pipe 31 toward the straight pipe 32. The SCR device 4 is connected to a downstream end of the downstream elbow pipe 33.

The SCR device 4 includes a cylindrical casing 41 and a cylindrical SCR 42 housed inside the casing 41. The SCR 42 reduces and purifies nitrogen oxides in the exhaust gas with ammonia (reductant) generated in the mixing device 3. An ammonia reduction catalyst may be provided downstream of the SCR 42 in the casing 41. The ammonia reduction catalyst oxidizes the ammonia unused in the SCR 42 to render the ammonia harmless, thereby further reducing emissions in the exhaust gas.

The urea aqueous solution injected from the injector 5 to the exhaust gas is thermally decomposed by the heat of the exhaust gas to become ammonia. The ammonia is supplied to the SCR device 4 as a reductant together with the exhaust gas.

The above-described DPF device 2, the mixing device 3 and the SCR device 4 are juxtaposed so that the flow directions of the exhaust gas flowing in the devices become substantially parallel. In this arrangement, the directions of the exhaust gas flowing inside the DPF device 2 and the SCR device 4 are opposite to the flow direction of the exhaust gas flowing inside the mixing device 3. Thus, these devices 2 to 4 are arranged substantially in an S-shape in a plan view. Accordingly, the size of the exhaust aftertreatment device 1 can be made compact as a whole, thereby allowing the exhaust aftertreatment device 1 to be securely disposed (e.g. mounted on an engine) in a limited housing space such as an engine room.

Figure 2:
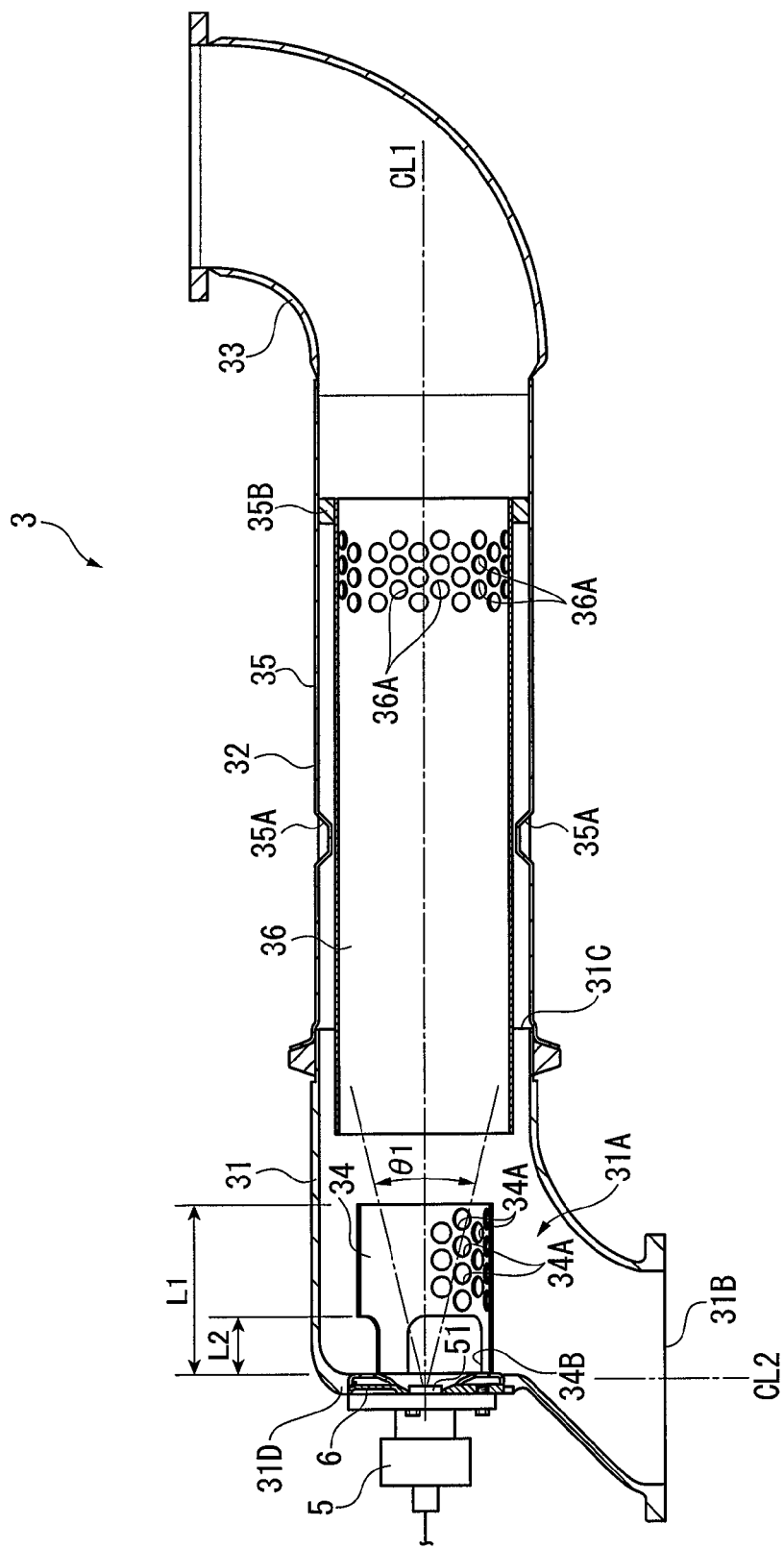
FIG. 2 is a cross section showing a mixing device of the exhaust aftertreatment device.

FIG. 2 is a cross section of the mixing device 3. The mixing device 3 will be described below with reference to FIG. 2.

In the mixing device 3 shown in FIG. 2, a part of the upstream elbow pipe 31 for changing the flow direction of the exhaust gas is defined as a direction-changing section 31A. The upstream elbow pipe 31 includes: a circular inlet 31B opened to and connected with the outlet pipe 23 (FIG. 1) of the DPF device 2; and a circular outlet 31C opened to and connected with the straight pipe 32. The direction-changing section 31A is defined between the circular inlet 31B and the outlet 31C. An injector attachment 6 is provided to an outside of the direction-changing section 31A of the upstream elbow pipe 31. An injector 5 is attached from an outside of the injector attachment 6. A mixing pipe 34 is attached from an inside (i.e. interior side of the direction-changing section 31A) of the injector attachment 6. The injection nozzle 51 of the injector 5 and the mixing pipe 34 are each disposed on an axial line CL1 of the straight pipe 32.

The straight pipe 32 has a double-tube structure of an outer tube 35 and an inner tube 36 disposed inside the outer tube 35. Both of the outer tube 35 and the inner tube 36 are formed in a form of a cylinder. The inner tube 36 is welded or the like to a plurality of supporting recesses 35A provided to the outer tube 35 at an approximately axial middle thereof and is welded or the like to an inner wall of the outer tube 35 through an annular support member 35B at a downstream end thereof. Further, an upstream end of the inner tube 36 protrudes into the upstream elbow pipe 31. The upstream end of the inner tube 36 is defined so that the urea aqueous solution injected by the injector 5 at an injection angle θ1 (see chain lines in FIG. 2) of approximately 25 degrees securely enters an inside of the inner tube 36. A plurality of openings 36A are provided on an area near the downstream end of the inner tube 36.

The exhaust gas flows into a gap between the outer tube 35 and the inner tube 36. Since the supporting recesses 35A are discontinuously provided in the circumferential direction, the entered exhaust gas flows to the support member 35B through gaps between the supporting recesses 35A. The annular support member 35B blocks the flow of the exhaust gas, so that the exhaust gas flows into the inner tube 36 through the openings 36A to be joined with the exhaust gas flowing inside the inner tube 36 to be further flowed toward the downstream. In other words, the inner tube 36 is efficiently heated by the exhaust gas flowing inside and outside the inner tube 36. Thus, the urea aqueous solution injected to the inside of the inner tube 36 is securely thermally decomposed without being turned to droplets even when being adhered to an inner wall of the inner tube 36.

One axial end of the mixing pipe 34 is supported by an inner wall of the injector attachment 6 while the other end of the mixing pipe 34 is opened to the straight pipe 32. The mixing pipe 34 is disposed in the upstream elbow pipe 31 to surround the urea aqueous solution injected from the injector 5. The exhaust gas is blown to the mixing pipe 34 from a lower side (in the figure) near the inlet 31B of the upstream elbow pipe 31. The direction of the flow of the exhaust gas from the lower side is changed to be along the axial line CL1 at the direction-changing section 31A.

The mixing pipe 34 has characteristic structures of a plurality of circular holes 34A provided on a part of a circumferential wall from a substantially axial center to an end (an end near the straight pipe 32) and a plurality of cutouts 34B provided to the circumferential wall from the substantially axial center to a base end (an end near the injector 5). The exhaust gas flows into the inside of the mixing pipe 34 through the circular holes 34A and the plurality of cutouts 34B.

The circular holes 34A are substantially evenly provided in the axial direction of the mixing pipe 34 while the circular holes 34A are concentrated in two areas in the circumferential direction of the mixing pipe 34. Specifically, when the cylindrical mixing pipe 34 is circumferentially quadrisected in ninety degrees, the circular holes 34A are provided only in two radially opposed areas while the circular holes 34A are not provided on the other mutually opposed areas. The exhaust gas flowed into the mixing pipe 34 through the circular holes 34A generates a swirl in the mixing pipe 34 due to the above arrangement of the circular holes 34A. As a result, the urea aqueous solution injected to the swirl is efficiently mixed with the exhaust gas within the mixing pipe 34.

The cutouts 34B are provided along the circumferential direction of the mixing pipe 34. The exhaust gas flowing into the mixing pipe 34 through the cutouts 34B is directed toward the injection nozzle 51 due to the presence of the cutouts 34B at the base end. In addition, an axial length L2 of each of the cutouts 34B is approximately 34% (L2/L1≈0.34) of an axial length L1 of the entirety of the mixing pipe 34. Thus, the exhaust gas passing through the cutouts 34B smoothly flows toward the injection nozzle 51 while flowing closely over a surface of an inner wall of the injector attachment 6 (see an arrow in FIG. 3).

The mixing pipe 34 is provided by punching etc. a flat metal plate to form the circular holes 34A and the rectangular cutouts 34B, curving the metal plate into a cylindrical form after the punching in a predetermined developed figure, and welding the butted portion of the curved plate. The diameter and length of the mixing pipe 34 are defined so that the urea aqueous solution injected from the injector 5 is not in contact with the mixing pipe 34 (see θ1 shown in chain lines in FIG. 2).

The details of the injector attachment 6 will be described below with reference to FIG. 3.

Figure 3:
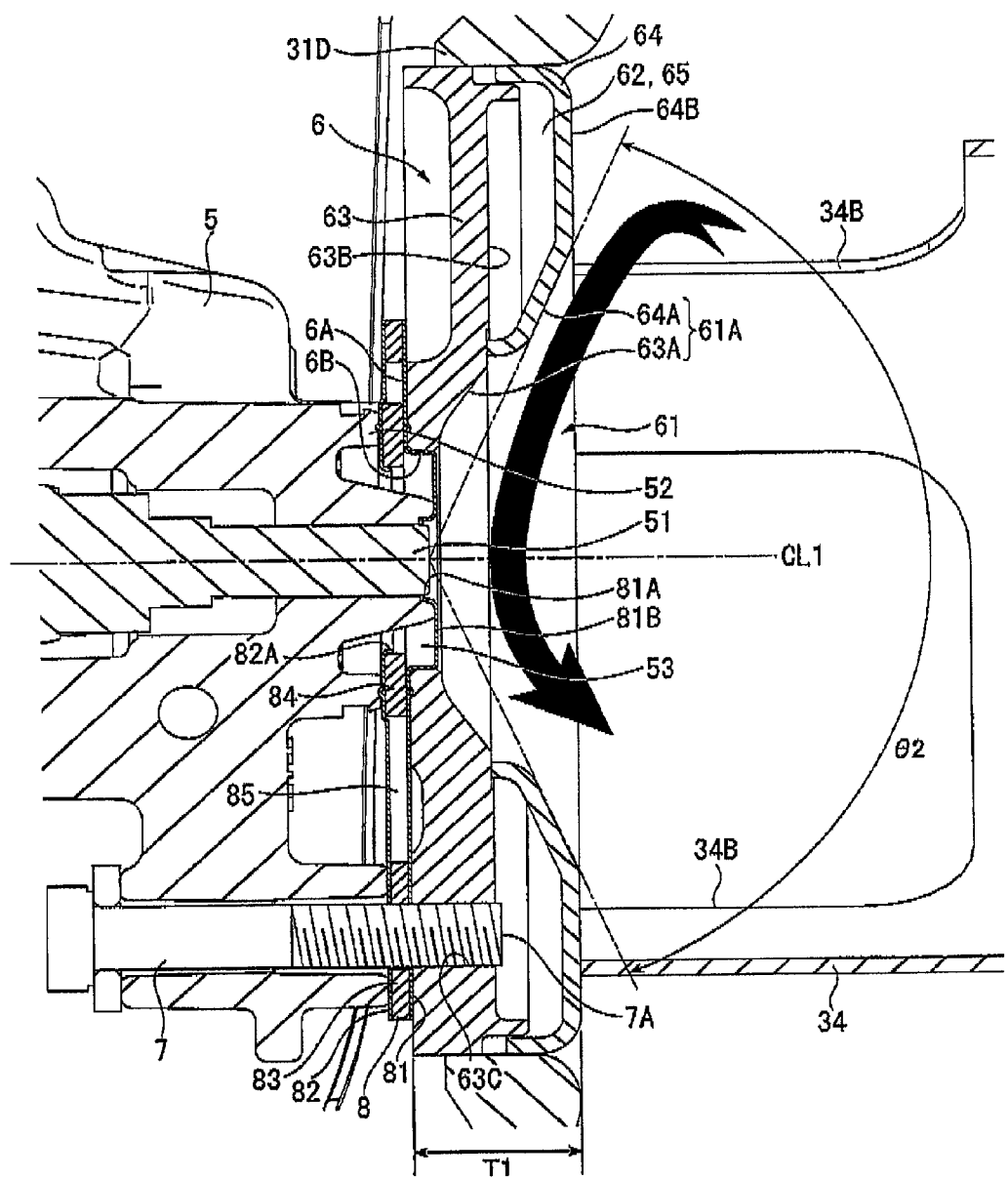
FIG. 3 is a cross section showing a relevant part of the mixing device in an enlarged manner.

FIG. 3 is a cross section showing the injector attachment 6 of the mixing device 3 in an enlarged manner. As shown in FIG. 3, the injector attachment 6 is welded to an injector attachment opening 31D of the upstream elbow pipe 31 so as to close the injector attachment opening 31D. The injector attachment 6 includes an annular base plate 63 provided with an attachment face 6A and an annular sub-plate 64 bonded to the base plate 63 on a side near an inside of the upstream elbow pipe 31. An outer circumference of the base plate 63 is welded to an inner surface of the injector attachment opening 31D.

The attachment face 6A of the injector attachment 6 for the injector 5 to be attached is substantially flush with an end of the injection nozzle 51. The base plate 63 of the injector attachment 6 is provided with an injection opening 6B for exposing the end of the injection nozzle 51 to the inside of the upstream elbow pipe 31, and a recess 61 enlarging from the injection opening 6B toward the straight pipe 32. The recess 61 has an inclined wall 61A in a shape of a funnel extending to both of the base plate 63 and sub-plate 64. Specifically, inclined portions 63A and 64A are respectively provided to the base plate 63 and the sub-plate 64. The inclined portions 63A and 64A are substantially continuously provided to define the inclined wall 61A. An open degree θ2 of the inclined wall 61A is, though not specifically limited, defined at 90 degrees or more, preferably as large as approximately 120 to 140 degrees so as for the exhaust gas to easily flow toward the depth side of the recess 61, i.e. to the vicinity of the injection nozzle 51.

A flat portion 63B orthogonal to the axial line CL1 is provided at an outer periphery of the inclined portion 63A of the base plate 63. A cross section of a circumferentially continuous portion of the sub-plate 64 is opened toward the base plate 63. The base plate 63 and the sub-plate 64 are mutually welded to be bonded along the inner and outer peripheries thereof to form an annular closed space 65 within the injector attachment 6. A flat portion 64B extending orthogonally to the axial line CL1 is provided at an outer periphery of the inclined portion 64A of the sub-plate 64. The base end of the mixing pipe 34 is welded to be bonded to the flat portion 64B. The flat portion 64B is not only for being bonded with the mixing pipe 34 but also serves for further enlarging the closed space 65. In other words, the volume of the closed space 65 is reduced when only the inclined portion 64 is provided without providing the flat portion 64B.

In addition, the flat portion 64B is substantially continuous with an inner surface of the upstream elbow pipe 31 in this exemplary embodiment, so that the entirety of the sub-plate 64 is housed within the injector attachment opening 31D without protruding into the inside of the upstream elbow pipe 31. Accordingly, there is no level difference enough to inhibit the flow of the exhaust gas between the inner surface of the upstream elbow pipe 31 and the flat portion 64B, so that the exhaust gas smoothly flows toward the injection nozzle 51 via the recess 61.

A heat-insulation layer 62 located near an outer periphery of the recess 61 is provided inside the injector attachment 6. The heat-insulation layer 62 is provided in the closed space 65. The heat-insulation layer 62 in this exemplary embodiment is provided by an air layer, where the air within the closed space 65 serves as a heat insulation material. Due to the presence of the heat-insulation layer 62, even when the sub-plate 64 exposed to the exhaust gas is heated, the heat is not easily transferred to the base plate 63. Consequently, a heat transfer toward the injector 5 can be restrained. In other words, since the heat-insulation layer 62 restrains the heat transfer, a thickness T1 of the injector attachment 6 and, consequently the depth of the recess 61 can be reduced. Accordingly, the exhaust gas more easily flows toward the injection nozzle 51 via the recess 61 while restraining the heat transfer, thereby enhancing the thermal decomposition of the urea aqueous solution around the injection nozzle 51.

The base plate 63 is provided with a bolt hole 63C penetrating front and back sides of the base plate 63. The injector 5 is rigidly attached onto the attachment face 6A by a bolt 7 screwed into the bolt hole 63C from an outside. It should be noted that, though a single bolt 7 is illustrated in FIG. 3, the injector 5 is rigidly attached by three bolts 7 in this exemplary embodiment. An end 7A of the bolt 7 reaches the closed space 65 to be exposed thereat, however, does not penetrate into the inside of the upstream elbow pipe 31. Accordingly, a heat transfer to the bolt 7 can also be restrained, whereby the injector 5 is reliably kept from being heated by the heat transferred via the bolt 7.

Further, in order to keep the exhaust gas from being leaked to an outside through a part around the injection nozzle 51, a substantially hexagonal gasket 8 is interposed between the injector attachment 6 and the injector 5 in this exemplary embodiment.

Figure 4A:
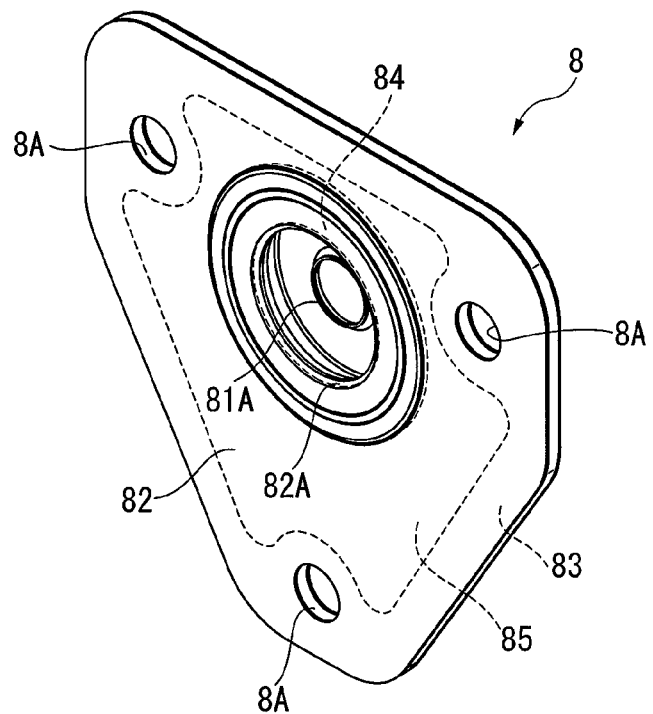
FIG. 4A is a perspective view showing a gasket used in the mixing device.
Figure 4B:
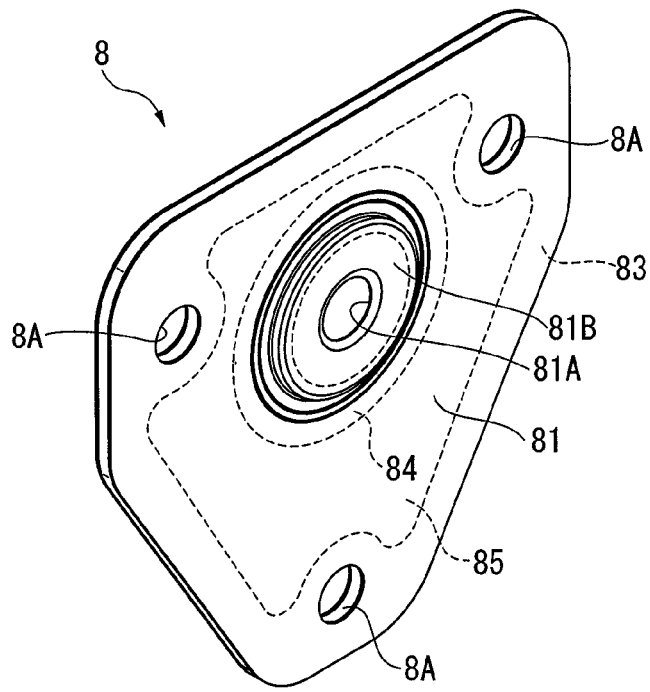
FIG. 4B is another perspective view showing the gasket used in the mixing device in a different direction.

As shown in FIGS. 3, 4A and 4B, the gasket 8 includes: an inner plate 81 that is adapted to be in contact with the attachment face 6A of the injector attachment 6 and has an inner opening 81A corresponding to the injection opening 6B; an outer plate 82 that is adapted to be in contact with the injector 5 and has an outer opening 82A corresponding to the injection opening 6B; an annular outer periphery support ring 83 held between outer peripheries of the inner plate 81 and the outer plate 82; and an annular inner periphery heat-insulation ring 84 held by a periphery of the inner opening 81A of the inner plate 81 and a periphery of the outer opening 82A of the outer plate 82.

The gasket 8 is provided with a through hole 8A to be penetrated by the bolt 7. The through hole 8A penetrates through the inner and outer plates 81 and 82 and the outer periphery support ring 83. Each of the plates 81 and 82 and the outer periphery support ring 83 are made of metal, thereby being adapted to reliably receive an axial tension applied when the bolt 7 is to be fastened. On the other hand, the inner periphery heat-insulation ring 84 is provided by a heat-insulative material.

The gasket 8 is defined therein with a gasket-side heat-insulation space 85 that is surrounded by each of the plates 81 and 82 and each of the rings 83 and 84 and serves as an heat-insulation layer. Accordingly, the gasket 8 itself serves for restraining the heat transfer, so that the heat is further kept from being transferred from the injector attachment 6 to the injector 5.

In addition, an annular abutment portion 52 provided to the injector 5 is in contact with the gasket 8 in this exemplary embodiment. The abutment portion 52 is located near an outer periphery of the injector 5 being spaced away from the end of the injection nozzle 51. Thus, an injection-nozzle-side heat-insulation space 53 opened to the upstream elbow pipe 32 is defined between the injection nozzle 51 and the abutment portion 52. The injection-nozzle-side heat-insulation space 53 is covered with a closing piece 81B defining a part around the inner opening 81A of the inner plate 81 of the gasket 8. Since an inner periphery of the closing piece 81B extends to the outer circumference of the end of the injection nozzle 51, the injection-nozzle-side heat-insulation space 53 including a gap between the injection opening 6B and the outer circumference of the end of the injection nozzle 51 is securely covered. The closing piece 81B is a component that defines a depth wall of the recess 61. Accordingly, in this exemplary embodiment in which the exhaust gas is easily flowed toward the depth wall, the closing piece 81B is heated to a high temperature. Accordingly, the injection-nozzle-side heat-insulation space 53 provided near the injector 5 of the closing piece 81B keeps the heat from the closing piece 81B from being easily transferred to the injector 5.

In this exemplary embodiment described above, since the heat-insulation layer 62 is provided around the recess 61 so that the heat of the exhaust gas is not easily transferred to the injector 5, the heat insulation performance of the injector 5 can be enhanced. Further, since the heat-insulation layer 62 is provided, the thickness of the injector attachment 6 and, consequently, the depth of the recess 61 can be reduced. Thus, the exhaust gas entering through the cutouts 34B of the mixing pipe 34 can be easily introduced toward the inside of the recess 61 as illustrated with a bold arrow in FIG. 3, whereby the residence of the urea aqueous solution can be restrained. Further, since the end of the bolt 7 for attaching the injector 5 reaches the heat-insulation layer 62 in the injector attachment 6 and is exposed thereat, the heat of the exhaust gas is restrained from being transferred to the injector 5 through the bolt 7.

Incidentally, it should be understood that the scope of the present invention is not limited to the above-described exemplary embodiments but includes modifications and improvements as long as the modifications and improvements are compatible with the invention.

For instance, though the heat-insulation layer 62 in the above exemplary embodiment is provided by an air layer, such an arrangement is not exhaustive. Specifically, any material that exhibits both of heat resistance and heat insulation properties may be filled in the closed space 65 to form the heat-insulation layer.

Though the gasket 8 is interposed between the injector attachment 6 and the injector 5 in the above exemplary embodiment, the gasket 8 is an optional component and may be provided as necessary, and an arrangement in which the gasket 8 is omitted is still within the scope of the invention. Further, even when a gasket is used, the structure, material and the like of the gasket may be determined as desired and is not limited to those mentioned in the above exemplary embodiment.

Though urea aqueous solution is used as the reductant aqueous solution, the other fluid may be used as the reductant aqueous solution in a modification of the invention.

The invention claimed is:

1. A reductant aqueous solution mixing device interposed between a filter device that captures particulate matter in an exhaust gas and a selective catalytic reduction device disposed downstream of the filter device, the reductant aqueous solution mixing device adding a reductant aqueous solution in the exhaust gas, and the reductant aqueous solution mixing device comprising:
    an elbow pipe attached to an outlet pipe of the filter device, the elbow pipe changing a flow direction of the exhaust gas flowing from the filter device;
    a straight pipe connected to a downstream side of the elbow pipe, the straight pipe extending in a direction intersecting an axial line of the outlet pipe of the filter device; and
    an injector attached to the elbow pipe, the injector injecting the reductant aqueous solution into an inside of the elbow pipe toward the straight pipe,
    wherein:
        the elbow pipe is provided with an injector attachment on which the injector is attached by a bolt,
        the injector attachment has an attachment face for the injector to be attached thereon, the attachment face being substantially flush with an end of an injection nozzle of the injector,
        the injector attachment is provided with a recess at which the end of the injection nozzle is exposed, the recess enlarging toward the straight pipe,
        a heat-insulation layer located near an outer periphery of the recess is provided inside the injector attachment,
        an end of the bolt penetrates the injector from an outside to reach the heat-insulation layer in the injector attachment,
        the injector attachment comprises a base plate on which the attachment face is provided and a sub-plate bonded to the base plate on a side near an inside of the elbow pipe,
        the heat-insulation layer is provided in a closed space defined by bonding the base plate and the sub-plate,
        an injection opening for exposing the end of the injection nozzle to the inside of the elbow pipe is provided to the injector attachment,
        a gasket is interposed between the injector attachment and the injector,
        the gasket comprises (i) an inner plate that is in contact with the attachment face of the injector attachment and has an inner opening corresponding to the injection opening, (ii) an outer plate that is in contact with the injector and has an outer opening corresponding to the injection opening, (iii) an annular outer periphery support ring held between outer peripheries of the inner plate and the outer plate, and (iv) an annular inner periphery heat-insulation ring held by a periphery of the inner opening of the inner plate and a periphery of the outer opening of the outer plate,
        a gasket-side heat-insulation space covered with the inner plate, the outer plate, the outer periphery support ring and the inner periphery heat-insulation ring is provided inside the gasket,
        an annular abutment portion to be in contact with the gasket is provided at a position of the injector close to an outer periphery of the injector and spaced away from the end of the injection nozzle,
        an injection-nozzle-side heat-insulation space opened toward an inside of the straight pipe through the injection opening is defined between the end of the injection nozzle and the abutment portion, and
        the injection-nozzle-side heat-insulation space is covered with the gasket.

2. The reductant aqueous solution mixing device according to claim 1, wherein an opening degree of the recess is in a range from 120 to 140 degrees.

3. The reductant aqueous solution mixing device according to claim 1, wherein the heat-insulation layer is an air layer.

4. An exhaust aftertreatment device, comprising:
a filter device that captures particulate matter in an exhaust gas;
a reductant aqueous solution mixing device according to claim 1, the reductant aqueous solution mixing device being disposed downstream of the filter device in parallel to the filter device; and
a selective catalytic reduction device disposed downstream of the reductant aqueous solution mixing device, the selective catalytic reduction device reducing and purifying nitrogen oxides in the exhaust gas.

* * * * *